United States Patent [19]

Lalloz et al.

[11] Patent Number: 4,900,487
[45] Date of Patent: Feb. 13, 1990

[54] METHOD OF PRODUCING A HOLLOW-BODIED COMPONENT

[75] Inventors: Guy Lalloz, Froideconche Luxeuil Les Bains; Gabriel Joly, Luxeuil Les Bains, both of France

[73] Assignee: Saplest S.A., Faucogney, France

[21] Appl. No.: 119,786

[22] Filed: Nov. 12, 1987

Related U.S. Application Data

[63] Continuation of Ser. No. 805,093, Dec. 4, 1985, abandoned.

[30] Foreign Application Priority Data

Dec. 5, 1984 [FR] France ................................. 8418523

[51] Int. Cl.$^4$ ...................... B29C 65/02; B29C 39/26; B29C 67/22
[52] U.S. Cl. .................. 264/45.2; 264/45.5; 264/51; 264/314; 264/248; 156/304.2; 156/307.1
[58] Field of Search .............. 264/248, 516, 545, 574, 264/45.2, 53, 45.1, 45.4, 46.4, 46.9, 45.5, 314, 51; 425/4 R, 817 R; 156/145, 304.2, 307.1

[56] References Cited

U.S. PATENT DOCUMENTS

| | | | |
|---|---|---|---|
| 1,163,987 | 12/1915 | Eggers | 264/574 |
| 3,530,208 | 9/1970 | Rausing | 264/314 |
| 3,832,437 | 8/1974 | Taylor | 264/248 |

Primary Examiner—Jan H. Salbaugh
Assistant Examiner—Neil M. McCarthy
Attorney, Agent, or Firm—Clifford A. Poff

[57] ABSTRACT

Seamless hollow-bodied objects of expanded polystyrene are made by a method in which polystyrene material in bead form is agglomerated about a solid removable core in a split mold. The mold halves are opened and the solid core is removed, leaving at least two preliminary sections in contact with the mold halves. The mold is reclosed, and an inflatable core is inserted and inflated to desired dimensions. The inflatable core is supplied with steam for its inflation and the polystyrene heating is completed. After deflation and removal of the inflatable core and opening of the mold halves, there is obtained a desired seamless hollow article having smooth surfaces inside and out.

4 Claims, 2 Drawing Sheets

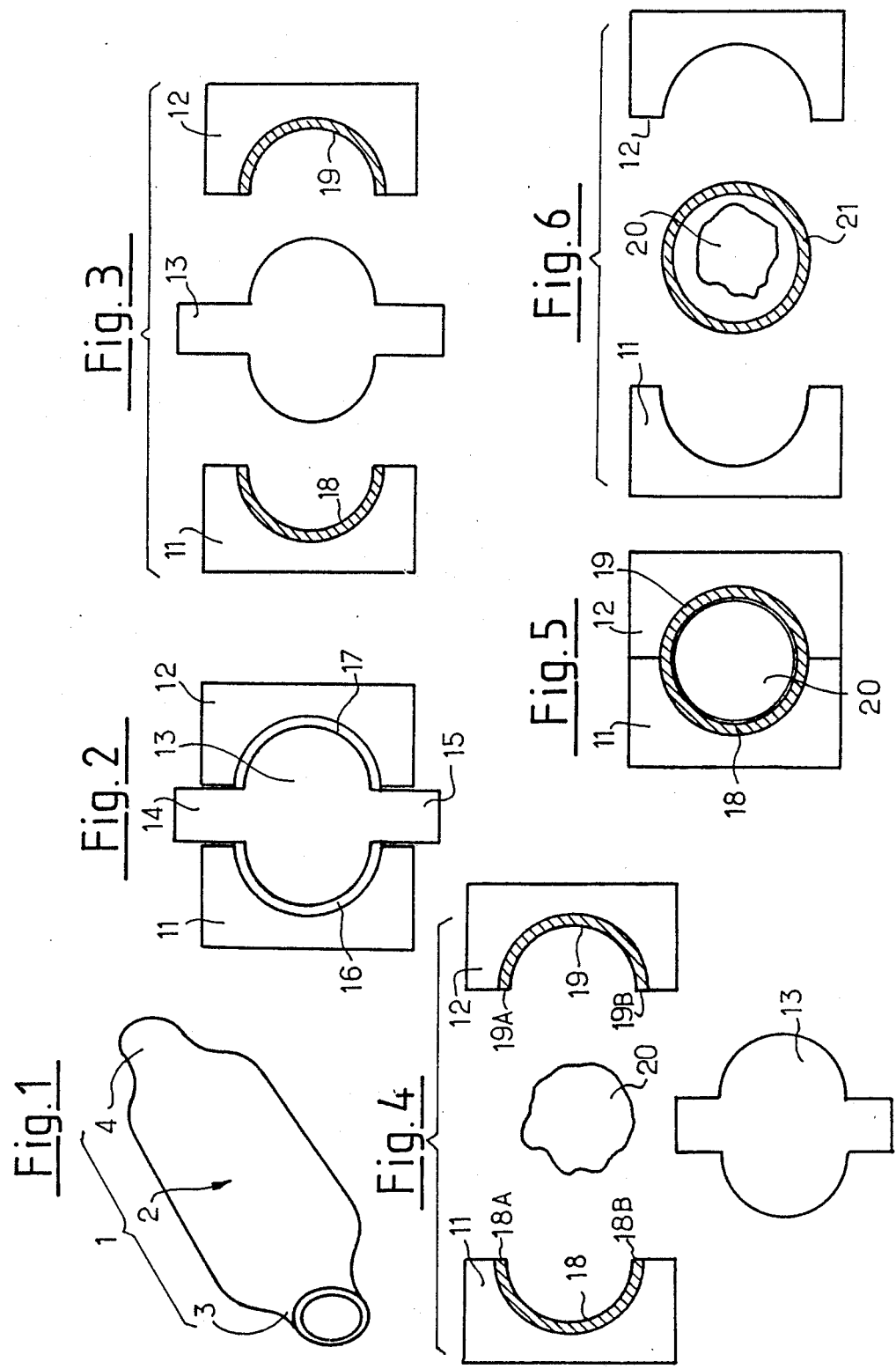

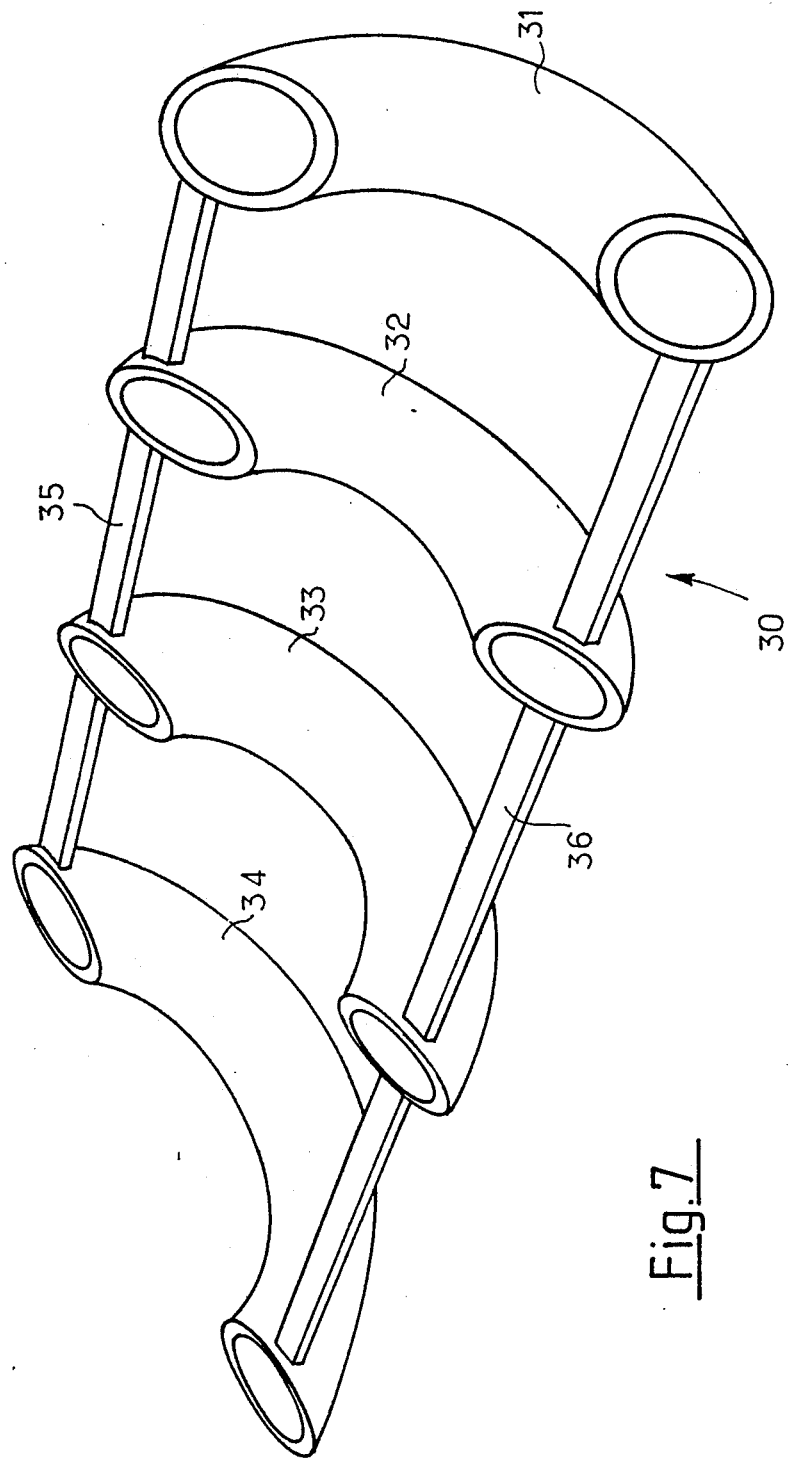

METHOD OF PRODUCING A HOLLOW-BODIED COMPONENT

This is a continuation of co-pending Ser. No. 805,093, filed on Dec. 4, 1985, and now abandoned.

BACKGROUND OF THE INVENTION

1. Field of the Invention

The present invention relates to a method of producing a hollow bodied component, and, more particularly, to a nondrawable component pf cellular or expanded synthetic material, such as polystyrene, by injection moulding.

2. Description of the Prior Art

The numerous advantages of cellular synthetic material such as expanded polystyrene have resulted in a rapid and important development in the use of cellular synthetic material in very different areas, such as the thermal insulation of buildings, packing material in packaging and more recently the use of such material to form disposable patterns for casting components in production lines.

For nearly twenty years in the casting industry, disposable patterns have been produced in expanded polystyrene. This method is still used for producing heavy components such as frames for machinery. In order to make such components, blocks or plates of desired dimensions are used together in order to form the shape of the desired pattern. The pattern is placed in the casting sand and the sand is packed down. The metal which can be aluminium is poured in the mold. The hot liquid metal melts in the pattern comprised of expanded polystyrene and the metal fills the space occupied by the pattern.

In recent years a technique has been developed for producing large quantities of medium-sized and small cast components because of the development of weaker granularity, lower density and brass formation characteristics of synthetic materials have evolved a great deal during the course of the last few years. The new techniques allow the injection molding of components with thinner walls having a better surface quality which has led to further development of producing castings using disposable patterns made of expanded polystyrene.

This technique is of particular interest in the automobile industry for the manufacture of components with interior cavities, such as, for example, intake or exhaust manifolds. The new techniques are very interesting because of the considerable reduction in the manufacturing costs of the cast components. There are still difficulties when producing certain castings because in the above case of intake and exhaust manifolds, the only method of producing disposable casting patterns consists in producing components having complex shape with a hollow and non-drawable, in two sections of expanded polystyrene, then drying the sections, and placing each section of the component on a template. Thus the sections are then joined together by adhesive such as "Hot Melt Glue".

Although this method of manufacturing is more interesting than the traditional method of moulding, it nevertheless has a number of disadvantages. It is necessary to carry out cold joining of the sections after moulding, which results in material increase in the cost of manufacturing the component. Furthermore, the component does not provide an interior and exterior surface having a required good quality because of the joint, and the seams between the adjoining sections.

SUMMARY OF THE INVENTION

An object of the present invention is to provide a method of manufacturing hollow-bodied components from expanded synthetic material, more particularly polystyrene, by injection moulding, which enables the number of operations involved in manufacturing such components to be reduced, allows almost complete automation of the operations for producing one component in a very inexpensive manner suitable for use as a disposable pattern for a casting and also having a faultless surface with regard to the interior surface and exterior surface of the completed component.

To this end, the invention relates to a method of manufacturing a hollow bodied component of synthetic material, more particularly, a cellular synthetic material, according to which the component parts are made up of divided sections which when assembled assume the shape of the required component, the method being characterized in that drawable preliminary sections are moulded so that when the preliminary sections are assembled they correspond to the shape of the required component, the preliminary sections are formed in the moulding cavities by moulds and cores, heat treatment of synthetic material in the molding cavities being taken to the point at which the preliminary sections in the moulding cavities stabilize, without the treatment taken to a final conclusion; then, the cores are extracted leaving the preliminary sections in the moulds whereupon the moulds are joined to join the preliminary sections together and form a single section of a shape corresponding to that of the component; the heating process and the thermal stabilization in the synthetic material are continued until final conclusion and then the finished component is taken from the mould.

The process enables hollow bodies to be produced having both excellent interior and exterior surface characteristics, with no trace of roughness or deformation at the place where the preliminary sections are joined and no machining or finishing on the final hollow component is required.

The method according to the invention is characterized by the simplicity of the means used in the process. The moulds, i.e., the shells and the cores, are simple, with no complex mechanisms required except for those required for moving the shells together and apart and those controlling the placement and removal of the core or cores.

The invention can also, but not exclusively, be used to produce hollow-bodied non-drawable components, i.e., where the core is in one section or is of a large size, larger than the dimensions of the opening(s) of the component. The method avoids producing the component in several sections which have to be joined together. This simplifies the manufacturing process and allows the process to be automated. The finished components have a faultless surface both on the exterior and interior which is extremely important for disposable casting patterns used to produce for example manifold distributors or intake and exhaust manifolds for internal combustion engines and all moulded components used for example for the passage of liquids.

The quality of these components thus obtained results not only from the fact that there is no join collar or line and from the condition of the component sections at the junction of the preliminary sections, but also because the preliminary sections are only stabilized in their mould parts to allow the core to be removed without heat treatment being carried out to a final conclusion. Also because the preliminary sections remain in their shells, their shape is maintained during the intermediate phase until the preliminary sections are joined together. The sides of the preliminary sections cannot be damaged and during the heat treatment to final conclusion, the preliminary sections are joined in a perfectly homogeneous way without the addition of any other material, such as adhesive.

The method for producing a non-drawable component, according to the present invention is explained in greater detail below. The desired component to be formed is charged from a non-drawable form to drawable preliminary sections which when assembled reconstitute the shape of the desired component. The drawable preliminary sections are moulded (in moulds consisting of shells and cores), the heat treatment of the molded synthetic material proceeds to the point where the preliminary sections are stabilized in the mould, without the heat treatment being carried out to final conclusion.

The cores are then removed from the mold shells leaving the preliminary sections in the shells and the shells are joined together to join the sections to form a single preliminary section of a shape corresponding to that of the non-drawable component. The heating and thermal stabilization of the synthetic material is then continued to final conclusion, and the finished component is removed from the moulded shells then continued to final conclusion and the finished component is removed from the mould.

According to another characteristic of the present invention, the interior of the single preliminary section made up of the two preliminary sections is pressurized so that the single preliminary section is pressed against the walls of the adjoined molded shells during heating and thermal stabilization.

This pressurization is achieved in particular through the use of an inflatable core which presses the walls of preliminary sections against the shells so that the finished component has a perfectly smooth interior surface.

More particularly, it is possible to use this pressurization of the interior of the finished component by means of an inflatable core to include the injection of steam or any other heat-bearing fluid.

After heating, it is possible to inject cold fluid in the pocket of the core to cool down the finished component or accelerate its cooling without cooling the shells (generally metal) too much, and thereby reduce the length of required time for the manufacturing cycle, i.e., increase production of finished components while reducing the energy consumption by the shells in the process.

The invention also provides apparatus for putting the process into operation. The apparatus is characterized in that is consists of: a set of shells and a core defining the moulding cavities for preliminary components; means for joining the shells in such a way as to form the complete shape of the required component from preliminary sections; and means for pressing the preliminary components against the walls of the shells.

According to another feature of the present invention, the core has attachments serving as support surfaces for the shells, a single core is used which is common to both shells.

DESCRIPTION OF THE DRAWINGS

The present invention will be described in more detail below with the aid of the attached drawings in which:

FIG. 1 is a perspective view of a hollow-bodied component made of cellular synthetic material which can be produced according to the method of the present invention;

FIG. 2 illustrates a first phase of the process wherein preliminary hollow bodied components are formed;

FIG. 3 illustrates a second phase of the process wherein the preliminary sections are retained in mould shells while the core member is removed;

FIG. 4 illustrates a third phase of the process wherein an inflatable core is located in position prior to the mould shells being moved together;

FIG. 5 is a fourth phase of the process in which the inflatable mould is inflated and heat treatment continued to termination;

FIG. 6 is a fifth phase of the process in which the inflatable core is deflated and the mould shells separated to remove the completed component; and FIG. 7 is an example of a complex component which can be produced by the method of the present invention.

DETAILED DESCRIPTION OF THE INVENTION

The perspective view of FIG. 1 illustrates a hollowed body component 1 made of cellular synthetic material which can be produced according to the present invention through phases of the process as shown in FIGS. 2–6. In FIG. 1, the hollow component 1 has a large central section 2 and two ends 3 and 4 which are of smaller dimensions than the larger central section as shown. The hollowed body component in FIG. 1 cannot be produced using a traditional shell and core, except in certain instances by using a complex drawable core. The method of the present invention will be described in connection with FIGS. 2–6 using the schematic example of the hollow cylindrical body 1 of FIG. 1 although the method of the present invention enables simple hollow components to be manufactured, the invention can be used to produce hollow bodied components which are nondrawable according to the current state of the art. As explained previously, non-drawable hollowed body components are components where the core is in one section or is of a large size so that its dimensions are larger than the dimensions of the opening in the component. In FIG. 2, there is illustrated a mould for producing two drawable preliminary sections which when joined together form a non-drawable hollow component. In the present case under discussion, it is assumed that by dividing the non-drawable hollow component into drawable sections results in the formation of two drawable sections. The mould for producing these drawable sections, sometimes referred to as preliminary sections, is part of the present invention and is comprised of two shells 11 and 12 and one core 13. The core 13 is combined to form a double core which is associated With both of the shells 11 and 12. The core 13 could be replaced by two cores associated with the respective shells. In the case with the mould with more than two shells there can be a single core or several cores depending on the circumstances. In all instances the core or cores along with the shells define the moulding cavities wherein the preliminary sections are formed. In the example of FIG. 2, the core 13 has two attachments 14 and 15 having surfaces which are turned towards the shells 11 and 12 and serve for supporting the shells. The shells can be joined together by the core 13 with the two attachments 14 and 15 establishing two cavities 16 and 17 wherein the preliminary drawable sections are to be produced. In the first phase of the process shown in FIG. 2, the shells 11 and 12 are applied to the core 13 of synthetic material is injected into the cavities 16 and 17. The synthetic material is in bead form. The injection of synthetic material is carried out in order to achieve sufficient agglomeration of the particles of the synthetic material and to provide stability to the preliminary sections formed in the cavities 16 and 17 without, however, the necessity of carrying the heat treatment process to conclusion.

The second phase of the process as shown in FIG. 2, follows the injection of synthetic material and the partial heat treatment thereof. The second phase, the shells 11 and 12 are moved apart, as shown, with the preliminary sections remaining in position in the shells 11 and 12. The rigid core 13 can now be removed.

FIG. 4 illustrates the core passed from its position between the shells and replaced by an inflatable core 20 which is put into the position which the core had previously occupied. The shells 11 and 12 are then closed against each other so that the sides 18a and 18b of the preliminary section 18 exactly match sides 19a and 19b of the preliminary section 19 and thereby forming a single section.

FIG. 5 shows a fourth phase of the process wherein the shells 11 and 12 are in a joined position and the preliminary sections 18 and 19 are joined. After the shells and sections are joined, the inflatable core 20 is inflated in order to accurately apply the preliminary sections 18 and 19 to the shells 11 and 12, respectively. During this phase of the process, the manufacturing cycle formed by the heat treatment is carried to completion and the heating of the components formed by the preliminary sections 18 and 19 is terminated. Thereafter, the completed section can cool and stabilize.

The fifth phase of the process is shown in FIG. 6 and in this phase, the inflatable core 20 is deflated the shells 11 and 12 are then moved apart and the core 20 is removed from the component 21 and the finished component removed from the position between the shells.

FIG. 7 illustrates an example of a complex component which can be produced by the process of the present invention. In FIG. 7, the component is a manifold 30 for an internal combustion engine. The manifold is formed with manifold distributors 31-34 which are joined together by braces 35 and 36.

We claim:

1. A method of making a hollow object comprising the steps of:

forming at least two preliminary sections with sides by introducing appropriate quantities of expandable polystyrene material in beadform into hollow spaces between a solid core member and an outer mold having at least two separable mold parts and, heating the expandable polystyrene material until the beads have sufficiently agglomerated to form said at least two preliminary sections which are thereby stabilized to facilitate removal of said core member;

opening said mold by spacing the two separable mold parts apart while each mold part carries one of said preliminary sections; removing said core member from between the separated mold parts; moving said mold parts into an abutting relationship to thereby position said sides of said preliminary sections against each other;

placing an inflatable core into a hollow interior formed by said preliminary sections;

inflating said inflatable core to hold said preliminary sections against said mold parts to thereby exactly match said sides placed against each other;

completing heating said preliminary sections to join together without adhesive said preliminary sections along said sides in a perfectly homogeneous way to form a unitary hollow object having a smooth and faultless surface on both the interior and exterior thereof;

terminating said heating;

deflating said inflatable core; and, removing said inflatable core and separable mold parts from the hollow object.

2. The method according to claim 1 wherein said step of inflating includes introducing steam in said inflatable core.

3. The method according to claim 1 wherein said solid core member includes core surfaces to form said sides.

4. The method according to claim 1 including the further step of allowing the hollow object to cool before said step of removing.

* * * * *